United States Patent
Rieth et al.

(10) Patent No.: US 9,692,625 B2
(45) Date of Patent: Jun. 27, 2017

(54) METHOD TO INCREASE DATA RATE/ROBUSTNESS BY USING TERNARY PRECODED SIGNALS FOR TRANSMISSION

(71) Applicant: Airbus Defence and Space GmbH, Ottobrunn (DE)

(72) Inventors: Dominik Rieth, Ottobrunn (DE); Christoph Heller, Ottobrunn (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 15/085,548

(22) Filed: Mar. 30, 2016

(65) Prior Publication Data
US 2016/0294592 A1 Oct. 6, 2016

(30) Foreign Application Priority Data

Mar. 31, 2015 (EP) ..................................... 15161941

(51) Int. Cl.
*H04L 27/18* (2006.01)
*H04L 27/22* (2006.01)
(Continued)

(52) U.S. Cl.
CPC .......... *H04L 27/22* (2013.01); *H04L 25/4906* (2013.01); *H04L 27/18* (2013.01); *H04L 27/20* (2013.01)

(58) Field of Classification Search
CPC . H04L 27/18; H04L 25/4902; H04L 25/4906; H04L 27/20; H04L 27/22
(Continued)

(56) References Cited

U.S. PATENT DOCUMENTS 3,679,977 A * 7/1972 Howson ................ H04L 25/497
375/290
5,534,827 A * 7/1996 Yamaji ..................... H03C 1/00
332/103
(Continued)

*Primary Examiner* — Emmanuel Bayard
(74) *Attorney, Agent, or Firm* — Crowell & Moring LLP

(57) ABSTRACT

A method for modulation of a signal with first binary data is provided in which the first binary data include a sequence of first binary numbers, wherein each first binary number includes either a first binary numerical value or a second binary numerical value. The method includes generating ternary data that includes a sequence of ternary numbers, where each ternary number comprises a first, second, or third ternary numerical value. The method also includes modulating a phase of the signal with the ternary data, where the phase of the signal can assume M different phase states, where M>2. The first, second, and third ternary numerical values correspond to first, second, and third state transitions between the M phase states. In the first state transition, a phase state is maintained, while in the second state transition and third state transition a change in the phase state is produced. According to one embodiment, the ternary data is generated such that all first binary numbers with the first binary numerical value are allocated to ternary numbers with the first ternary numerical value, and such that all first binary numbers with the second binary numerical value are allocated to ternary numbers with the second or third ternary numerical value so that in the sequence of ternary numbers, the second ternary numerical value does not directly follow the third numerical value and vice versa.

15 Claims, 3 Drawing Sheets

(51) Int. Cl.
*H04L 27/20* (2006.01)
*H04L 25/49* (2006.01)

(58) Field of Classification Search
USPC .................................. 375/269, 279–28, 308
See application file for complete search history.

(56) References Cited

U.S. PATENT DOCUMENTS

| | | | |
|---|---|---|---|
| 6,606,678 B1* | 8/2003 | Nakamura | G06F 13/4059 710/305 |
| 9,130,679 B1* | 9/2015 | Ip | H04B 10/556 |
| 2003/0035496 A1* | 2/2003 | Noda | H04L 27/186 375/308 |
| 2003/0063688 A1* | 4/2003 | Noda | H04L 25/4917 375/308 |
| 2003/0091213 A1* | 5/2003 | Yamakage | G06T 1/005 382/100 |
| 2004/0085937 A1* | 5/2004 | Noda | H04L 27/2046 370/335 |
| 2004/0131089 A1* | 7/2004 | Uemura | H04J 3/047 370/537 |
| 2005/0201479 A1* | 9/2005 | Noda | H04L 27/3438 375/261 |
| 2006/0088127 A1* | 4/2006 | Noda | H04L 25/4923 375/308 |
| 2006/0093046 A1* | 5/2006 | Nakamura | H03M 13/235 375/242 |
| 2008/0075194 A1* | 3/2008 | Ravi | H03F 1/0294 375/297 |
| 2009/0324247 A1* | 12/2009 | Kikuchi | G02F 1/225 398/159 |
| 2010/0265991 A1* | 10/2010 | Oh | H04B 1/71637 375/130 |
| 2010/0272150 A1* | 10/2010 | Kil | H04B 1/71637 375/130 |
| 2013/0214949 A1* | 8/2013 | Charlet | H03M 5/16 341/137 |

* cited by examiner

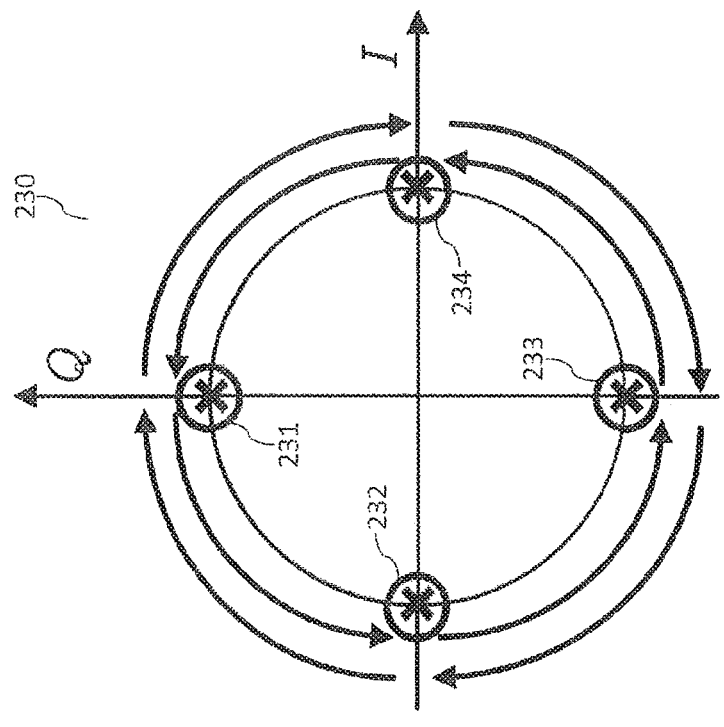
Fig. 2b
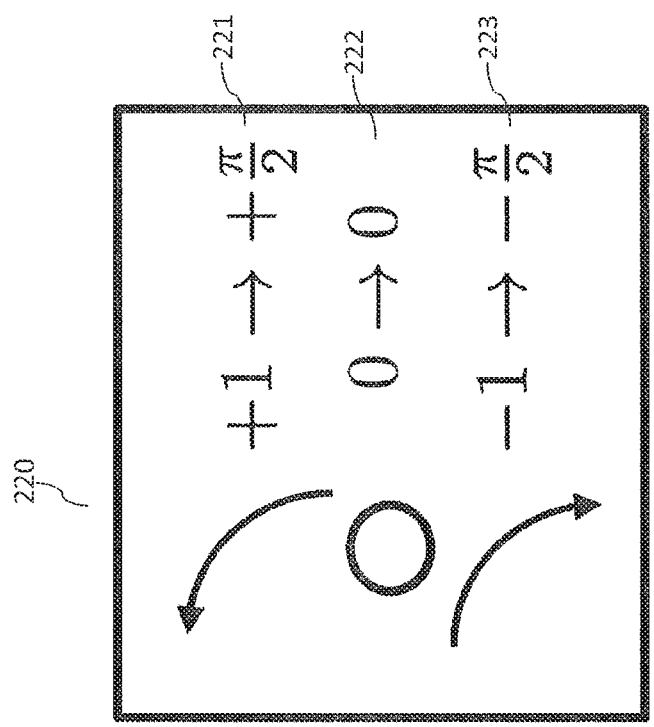

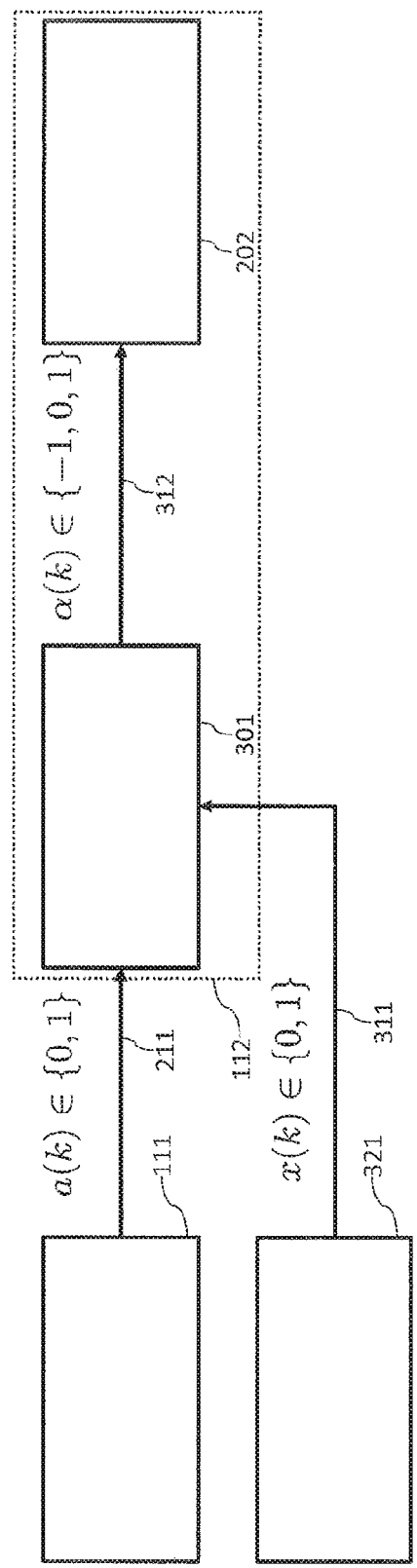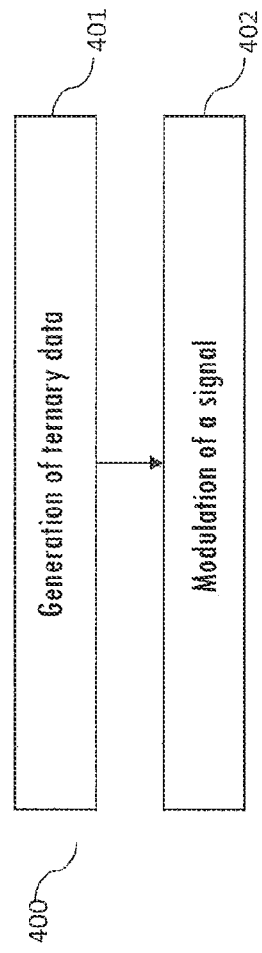

METHOD TO INCREASE DATA RATE/ROBUSTNESS BY USING TERNARY PRECODED SIGNALS FOR TRANSMISSION

CROSS-REFERENCE TO RELATED APPLICATIONS

This application claims priority under 35 U.S.C. §119 from European Patent Application No. 15161941.8, filed Mar. 31, 2015, the entire disclosure of which is herein expressly incorporated by reference.

BACKGROUND AND SUMMARY OF THE INVENTION

The present document concerns the wireless transmission of data. In particular, the present document concerns modulation methods that enable a high spectral efficiency and high energy efficiency.

In wireless transmission methods, high data rates, spectral efficiency, energy efficiency, and error robustness are desirable properties. For wireless transmission methods, various types of modulation can be used that are optimized with regard to one or more of the above-mentioned requirements. Since the frequency spectrum that is available for the transmission of data is limited, the spectral efficiency in particular is an important requirement. For operating a communication connection on a flying platform (e.g. on board an aircraft), energy efficiency is also an important requirement because typically, only limited amounts of energy are available on the flying platform. Modulation methods that are optimized for a low bandwidth usage (i.e. for a high spectral efficiency) and for high energy efficiency are typically limited with regard to the data rate that can be transmitted. In addition an optimization of bandwidth usage frequently comes at the expense of error robustness.

The present document concerns the technical object of creating a modulation method, which in addition to a high spectral efficiency and high energy efficiency, also enables a high data rate and/or high error robustness.

The technical object is attained by means of the independent claims. Advantageous embodiments are described in the dependent claims.

According to one aspect, a method for modulation of a signal with first binary data is described. The signal can also be referred to as a carrier signal. For example, the signal can comprise a sine/cosine-shaped signal with a particular frequency and/or amplitude. One phase of the signal can be modulated with the first binary data. The modulated signal can be transmitted from a transmitter to a receiver via a wireless transmission channel.

The first binary data include a sequence of first binary numbers a(k) in which each first binary number a(k) can assume either a first binary numerical value or a second binary numerical value. For example, the binary numerical values can be "0" and "1." In particular, the first binary numerical value can be "0" and the second binary numerical value can be "1."

The method includes the generation of ternary data in which the ternary data include a sequence of ternary numbers α(k) and each ternary number α(k) can assume a first, second, or third ternary numerical value. The ternary numerical values can be "−1," "0," and "+1." In particular, the first ternary numerical value can be "0." The second ternary numerical value can be "−1" and the third ternary numerical value can be "+1."

The method also includes the modulation of a phase of the signal with the ternary data. In this case, the phase of the signal M can assume different phase states, where M>2, with the first, second, and third ternary numerical values corresponding to first, second, and third state transitions between the M phase states. In other words, the first, second, and third ternary numerical values can represent first, second, and third state transitions. In the first state transition, a phase state is maintained. On the other hand, the second state transition and the third state transition produce a change in the phase state. For example, the second state transition can produce a change in the phase by $$+\frac{\pi}{2}$$

and third state transition can produce a change in the phase by $$-\frac{\pi}{2}.$$

The ternary data are generated in such a way that all of the first binary numbers a(k) with the first binary numerical value are allocated to ternary numbers α(k) with the first ternary numerical value. In other words, all first binary numbers a(k) with the first binary numerical value can be converted into ternary numbers α(k) with the first ternary numerical value.

In addition, the ternary data are generated in such a way that all first binary numbers a(k) with the second binary numerical value are allocated to ternary numbers α(k) with the second or third ternary numerical value so that in the sequence of ternary numbers α(k), the second ternary numerical value does not directly follow the third ternary numerical value and vice versa.

The method makes it possible to transmit data that goes beyond the first binary data in the modulated signal without thus reducing the spectral efficiency and energy efficiency of the modulated signal. This provides a modulation method, which, in addition to a high spectral efficiency and high energy efficiency, also enables a high data rate and/or high error robustness.

The ternary data can be generated in such a way that a contiguous block of first binary numbers a(k) with the second binary numerical value is allocated to numbers α(k) with the same ternary numerical value. In particular, a contiguous block of first binary numbers a(k) with the second binary numerical value can be allocated to a corresponding contiguous block of ternary numbers α(k) with the same ternary numerical value (either the second or third ternary numerical value). This allocation can be carried out for all contiguous blocks of first binary numbers a(k) with the second binary numerical value. It is thus possible to achieve the fact that in the sequence of ternary numbers α(k), the second ternary numerical value does not directly follow the third ternary numerical value and vice versa.

The ternary data can be generated in such a way that a ternary number α(k) is allocated to the second or third ternary numerical value as a function of second binary data. It is thus possible, based on the ternary numerical value of a ternary number α(k), for second binary data that go beyond the first binary data to be transmitted without thus reducing the spectral efficiency and energy efficiency.

In particular, the second binary data can include a second binary number x(n) and depending on the second binary number x(n), a ternary number a(k) can assume the second ternary numerical value or third ternary numerical value. In other words, a contiguous block of ternary numbers α(k) can be used for a contiguous block of first binary numbers a(k) with the second binary numerical value in order to transmit (exactly) one second binary number x(n) from the second binary data.

The method can also include provision of a one-to-one allocation between the first and second binary numerical values on the one hand and the second and third ternary numerical values on the other. The one-to-one allocation can, for example, be α=2x−1, where x is the numerical value of a second binary number x(n) from the second binary data. The variable α is the numerical value of a ternary number α(k) from the ternary data, where the numerical value x of the second binary number x(n) is to be coded into this ternary number α(k).

The ternary data can be generated in such a way that either the second or third ternary numerical value is allocated as a function of the one-to-one allocation. In particular, the one-to-one allocation can be used to determine whether—as a function of the numerical value x of a second binary number x(n)—a contiguous block of ternary numbers α(k) assumes the second ternary numerical value or first ternary numerical value. The use of a one-to-one allocation enables a unique coding of second binary data into the ternary data.

The second binary data can include second binary data x(n) for error correction of at least one of the first binary numbers a(k) of the first binary data. It is thus possible to increase the error robustness of the modulation method in an efficient way. Alternatively or in addition, the second binary data can include information that goes beyond the first binary data. It is thus possible to increase the data rate of the modulation method.

For example, the second binary data and the first binary data can be part of an overall sequence of binary numbers. The method can include the allocation of a binary number from the overall sequence—which directly follows a binary number with the second binary numerical value—to the second binary data. In addition, binary numbers from the overall sequence, which have the first binary numerical value, can be at least partially allocated to the first binary data. In particular, the binary numbers can be allocated to the first binary data as long as the binary numbers assume the first numerical value. If a binary number assumes the second numerical value, then this binary number can still be allocated to the first binary data. The binary number directly following this is then allocated to the second binary data and the binary number directly following that is then allocated again to the first binary data. It is thus possible to carry out a gradual division of the overall sequence into first binary data and second binary data. It is thus possible to accelerate the transmission of the overall sequence of binary numbers.

The phase of the signal can be modulated in such a way that between two successive ternary numbers α(k−1) and α(k), the phase will be continuously converted from a current phase state to a new phase state in accordance with the first, second, or third state transition. In other words, the transitions between the phase states can occur in a fluid fashion and not abruptly. The phase of the signal can thus be modulated in accordance with the ternary data by means of a continuous phase modulation method. It is thus possible to achieve a high spectral efficiency.

The phase of the signal can, for example, assume M=4 different phase states. (At least some of) the different phase states can have a phase distance of $$\frac{\pi}{2}$$

from one another. The M different phase states can in particular include a first phase state with a phase (0+φ), a second phase state with a phase $$\left(\frac{\pi}{2}+\varphi\right),$$

a third phase state with a phase (π+φ), and a fourth phase state with a phase $$\left(-\frac{\pi}{2}+\varphi\right),$$

where $$\varphi \in \left[0, \frac{\pi}{2}\right),$$

e.g. φ=0. Examples of this include a QPSK modulation method or an offset QPSK modulation method, for example.

The sequence of ternary numbers α(k) typically includes a number of ternary numbers α(k), which corresponds to the number of first binary numbers a(k) of the sequence of first binary numbers a(k). Also typically, each first binary number a(k) is allocated to exactly one ternary number α(k) (and vice versa).

According to another aspect, a modulator for a transmitter of an (if necessary wireless) transmission system is described. The modulator includes a precoder, which is equipped to generate ternary data from first binary data. The first binary data include a sequence of first binary numbers a(k) in which each first binary number a(k) can assume a first binary numerical value or second binary numerical value. The ternary data include a sequence of ternary numbers α(k) in which each ternary number α(k) can assume a first, second, or third ternary numerical value.

The modulator also includes a modulation unit that is equipped to modulate a phase of a signal with the ternary data. The phase of the signal can assume M different phase states, where M>2. The first, second, and third ternary numerical values respectively correspond to first, second, and third state transitions between the M phase states; in the first state transition, a phase state is maintained; and the second state transition and third state transition produce a change in the phase state.

The precoder is equipped to generate the ternary data in such a way that all first binary numbers a(k) with the first binary numerical value are allocated to ternary numbers α(k) with the first ternary numerical value. The precoder is also equipped to allocate all first binary numbers a(k) with the second binary numerical value to ternary numbers α(k) with the second or third ternary numerical value so that in the sequence of ternary numbers α(k), the second ternary numerical value does not directly follow the third ternary numerical value and vice versa.

According to another aspect, a method is described for demodulation of a signal that has been modulated with ternary data. The ternary data include a sequence of ternary numbers α(k) in which each ternary number α(k) can assume a first, second, or third ternary numerical value. The method includes the determination of ternary data from a phase of the signal in which the phase of the signal can assume M different phase states, where M>2. The first, second, and third ternary numerical values correspond to first, second, and third state transitions among the M phase states; in the first state transition, a phase state is maintained; and the second state transition and third state transition produce a change in the phase state.

The method also includes the determination of first binary data from the ternary data, in which the first binary data include a sequence of first binary numbers a(k) and each first binary number a(k) can assume either a first binary numerical value or a second binary numerical value. The binary data are determined in such a way that all ternary numbers α(k) with the first ternary numerical value are allocated to a first binary number a(k) with the first binary numerical value. In addition, the binary data are determined in such a way that all ternary numbers α(k) with the second or third ternary numerical value are allocated to a first binary number a(k) with the second binary numerical value.

In addition, if necessary, additional second binary numbers x(n) can be taken from the ternary numbers α(k), which have the second or third ternary numerical value. The one-to-one allocation described in this document can be used for this. In particular, from a contiguous block of ternary numbers α(k) with the second or third ternary numerical value, the binary numerical value of exactly one second binary number x(n) can be determined. For this purpose, the method for demodulation of a signal can include method steps or features that correspond to the method steps or features of the method for the modulation of a signal described in this document.

According to another aspect, a demodulator for a receiver of a transmission system is described. The demodulator includes a demodulation unit, which is equipped to determine ternary data from a phase of a received signal. The ternary data include a sequence of ternary numbers α(k) in which each ternary number α(k) can assume a first, second, or third ternary numerical value. The phase of the signal can assume M different phase states, where M>2. The first, second, and third ternary numerical values correspond to first, second, and third state transitions among the M phase states; in the first state transition, a phase state is maintained; and the second state transition and third state transition produce a change in the phase state.

The demodulator also includes a decoder unit, which is equipped to determine first binary data from the ternary data, where the first binary data include a sequence of first binary numbers a(k) and each first binary number a(k) can assume either a first binary numerical value or a second binary numerical value. The binary data are determined by the decoder unit in such a way that all ternary numbers α(k) with the first ternary numerical value are allocated to a first binary number a(k) with the first binary numerical value and all ternary numbers α(k) with the second or third ternary numerical value are allocated to a first binary number a(k) with the second binary numerical value.

It should be noted that the methods, devices, and systems described in this document can be used both alone and in combination with other methods, devices, and systems described in this document. In addition, any aspects of the methods, devices, and systems described in this document can be combined with one another in various ways. In particular, the features of the claims can be combined with one another in various ways.

Other objects, advantages and novel features of the present invention will become apparent from the following detailed description of the invention when considered in conjunction with the accompanying drawings.

BRIEF DESCRIPTION OF THE DRAWING FIGURES

The invention will be described in greater detail below based on exemplary embodiments. In the drawings:

FIG. 2b shows states and state transitions of an exemplary modulation method;

FIG. 3 shows a block diagram of another exemplary modulator; and

FIG. 4 shows a flow chart of an exemplary method for the modulation of a signal.

DETAILED DESCRIPTION OF THE DRAWING FIGURES

As stated at the beginning, the present document concerns the creation of a modulation method, which makes it possible to increase a data rate and/or the error robustness. At the same time, the modulation method should have an unchanged, high spectral efficiency and energy efficiency.

Figure 1:
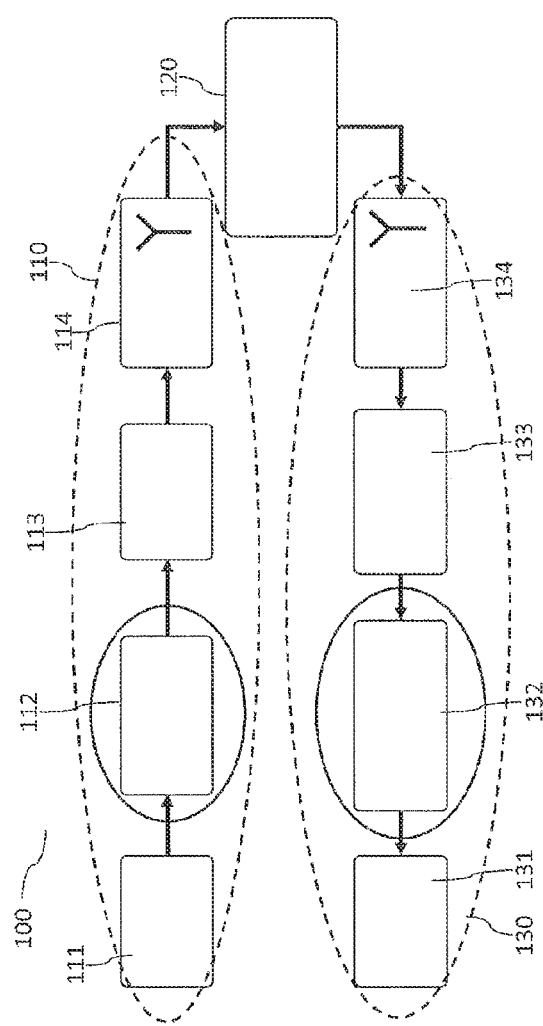
FIG. 1 shows a block diagram of an exemplary transmission system.

In this connection, FIG. 1 shows a block diagram of an exemplary data transmission system 100. The transmission system 100 is equipped to transmit data from a transmitter 110 via a wireless transmission channel 120 to a receiver 130. The transmitter 110 includes a data source (also referred to as a bit source) 111, which is equipped to supply a sequence of binary data a(k). In addition, the transmitter 110 includes a modulator 112, which is equipped to modulate the sequence of binary data α(k) onto a carrier signal. The transmitter 110 also has a transmitter front-end 113, which is equipped to prepare the modulated carrier signal for the transmission (e.g. to transfer the modulated carrier signal from a base frequency band into a transmission frequency band) and to prepare a transmission signal. The transmission signal is then output on the wireless transmission channel 120 via an antenna 114.

In a way that corresponds to the transmitter 110, the receiver 130 includes an antenna 134 for receiving the transmission signal and a receiver front-end 133 for preparing a modulated reception signal (e.g. by transferring it into the base frequency band). In conjunction with a demodulator 132, the sequence of binary data can be determined from the modulated reception signal and conveyed to a data sink (also referred to as a bit sink) 131.

The modulator 112 can be equipped to execute a so-called continuous phase modulation (CPM) method. Because of their constant envelope, CPM methods permit the use of nonlinear amplifiers and thus achieve a high energy efficiency. A subfamily of CPM methods are so-called shaped offset quadrature phase shift keying (SOQPSK) methods, which simultaneously enable a reduction of the bandwidth required for transmission (i.e. a high bandwidth efficiency). The transmission rate for this type of modulation, however, is only 1 bit/symbol and thus limits the maximum data rate that can be transmitted. In addition, as a result of the bandwidth reduction, there is a lower error robustness than before the bandwidth reduction.

Figure 2A:
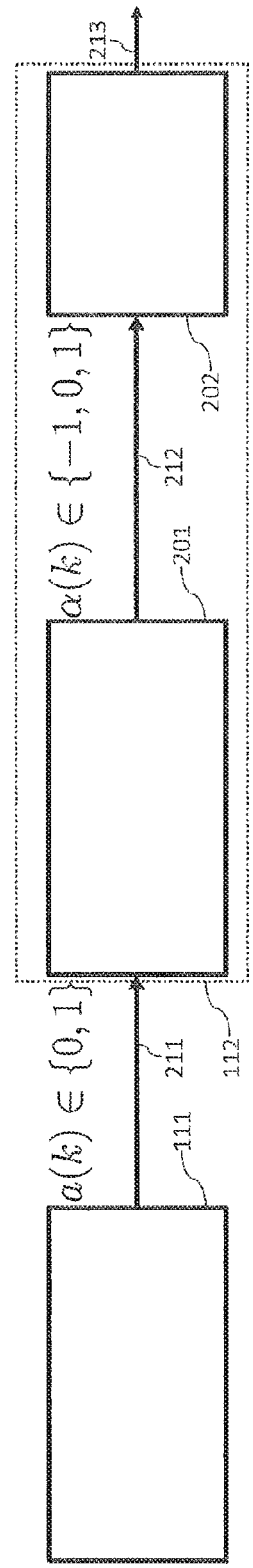
FIG. 2a shows a block diagram of an exemplary modulator.

The modulator 112 for executing the SOQPSK method has a precoder 201, which is equipped to generate ternary data 212 from the binary data 211, so that each binary number a(k)∈{0,1} of the binary data 211 is mirrored by a ternary number α(k)∈{−1,0,1} of the ternary data 212 (see FIG. 2a). One possibility for determining a ternary numerical value from a binary numerical value is given by the following formula:

$$\alpha(k)=(-1)^{k+1}(2a(k-1)-1)(a(k)-a(k-2)).$$

After the determination of ternary data 212, they are modulated onto a carrier signal in a modulation unit 202. The modulation unit 202 can in particular be equipped to execute a CPM method. FIG. 2b shows a modulation method based on offset QPSK. On the right side, different phase states 230 are shown, without limiting the generality, in particular the phase states 0 (reference numeral 234), $$\frac{\pi}{2}$$

(reference numeral 231), π (reference numeral 232), and $$-\frac{\pi}{2}$$

(reference numeral 232). Alternatively, shifted values are also conceivable. FIG. 2b also shows state transitions 220 and the ternary numerical values that result in the individual state transitions 220. Thus a ternary numerical value of +1 can result in a phase shift of $$+\frac{\pi}{2}$$

(reference numeral 221). A ternary numerical value of 0 can result in a phase shift of 0 (reference numeral 222) and a ternary numerical value of −1 can result in a phase shift of $$-\frac{\pi}{2}$$

(reference numeral 223). In this document, the ternary numerical value of 0 is also referred to as the first ternary numerical value. In this document, the state transition with a phase shift of 0 is also referred to as the first state transition 222.

In the CPM method, a continuous change in the phase of a carrier signal takes place between two ternary numbers α(k). This means that in a time interval between two successive ternary numbers α(k), the phase continuously changes in accordance with the predefined state transitions 220, from an initial state 230 to an end state 230 (e.g. from an initial state 234 and a state transition 221 to the end state 231). This continuous transition between the states 230 results in a high energy efficiency of the CPM method.

The precoder 201 is equipped to determine the ternary data 212 in such a way that no symbol changes from −1 to +1 and/or from +1 to −1 occur in the ternary data 212. It is thus possible to avoid the occurrence of state transitions 221 and 223 that directly succeed one another, which is advantageous for the spectral efficiency of the modulation method.

On the other hand, the generation of ternary data 212 results in the fact that with each offset QPSK symbol, only one binary numerical value, i.e. 1 bit, can be transmitted. In the following, a method will be described, which makes it possible to modulate additional data (to increase the data rate and/or to increase the error robustness) onto the carrier signal. To achieve this, the precoding can in particular be modified from offset QPSK (OQPSK) or from a filtered/shaped variant (e.g. SOQPSK) in order, while maintaining the same spectral bandwidth and the same energy efficiency, to increase either the data rate or the robustness of the transmission, or to combine the two. To that end, additional data can be incorporated into the ternary data 212 for transmission, taking into account the energy efficiency and bandwidth efficiency. These additional data can be used to increase the data rate and/or the robustness.

FIG. 3 shows a modulator 112, which in addition to first binary data 211 from a first data source 111, is equipped to incorporate second binary data 311 from a second data source 321 into the ternary data 312. The second binary data 311 can be used to increase the error robustness of the first binary data 211 (e.g. by inserting error correction bits) and/or to increase the data rate of the transmission system 100.

The second binary data 311 in this case are inserted into the ternary data 312 in such a way that the efficiency requirement continues to apply, namely that the ternary data 312 do not have any direct transitions from −1 to +1 or from +1 to −1 and a state transition 221 is not directly followed by the contrary state transition 223 (or vice versa). This efficiency requirement ensures that the spectral efficiency and/or the energy efficiency of the modulation method are maintained.

In addition, the allocation of the first binary data 111 to the ternary data 312 should produce free spaces in order to be able to also transmit the second binary data 311 within the ternary data 312. These free spaces can be achieved by means of the following allocation rules:

A first binary number α(k) of the first binary data 111 with a first binary numerical value (either 0 or 1) is allocated to a ternary number α(k) of the ternary data 312 with the first ternary numerical value. In other words, first binary numbers α(k) of the first binary data 111 with the first binary numerical value (either 0 or 1) are allocated to the first state transition 222 in which no change in phase takes place.

As a result of the first allocation rule, for a receiver 130, it is known that when the ternary data 312 indicate a state transition 220 other than the first state transition 222, the value of the first binary data 111 must correspond to the second binary numerical value (i.e. either 1 or 0) in which the second binary numerical value is the binary numerical value that is complementary to the first binary numerical value. In other words, in the above-mentioned example, if a ternary number α(k) assumes the value −1 or +1, then it is known that the corresponding first binary number a(k) has the second binary numerical value.

The circumstance of whether a ternary number α(k) assumes the value −1 or +1 can be used to transmit additional second data 311. In order to continue fulfilling the above-mentioned efficiency requirement, i.e. in order to avoid direct transitions between −1 and +1, in a contiguous block of second binary numbers a(k) with the second numerical value, it is possible for only one second binary number x(n) (i.e. only one bit) of the second binary data 311 to be coded.

In particular, a contiguous block of first binary numbers a(k) with the second binary numerical value can be converted into a contiguous block of ternary numbers α(k) with the ternary numerical value +1 or −1, where the circumstance of whether the contiguous block of ternary numbers α(k) assumes the ternary numerical value +1 or the ternary numerical value −1 depends on the second binary number x(n) of the second binary data 311 that is to be transmitted. In particular, through a one-to-one allocation, the binary numerical values {0, 1} can be allocated to the ternary numerical values {−1, +1}, e.g. by means of the formula α=2x−1, where x∈{0,1} is the binary numerical value of a second binary number x(n) of the second binary data 311 and where α∈{−1, +1} corresponds to the ternary numerical value of the ternary number α(k), into which the second binary number x(n) is to be coded.

Table 1 shows exemplary second binary data 311 and Table 2 shows exemplary first binary data 111. The second binary data 311 include a sequence of second binary numbers x(n), where n=1, . . . , N and N=6 in Table 1. The first binary data 111 include a sequence of first binary numbers a(k), where k=1, . . . , K and K=17 in Table 2.

It is clear from Table 2 that based on the allocation rule, all first binary numbers a(k) with the binary numerical value "0" are allocated to ternary numbers α(k) of the ternary data 312 with the ternary numerical value "0." Because of the one-to-one allocation, the contiguous blocks of first binary numbers a(k) with the binary numerical value "1" are allocated to corresponding contiguous blocks of ternary numbers α(k), where the ternary numerical value of a contiguous block of ternary numbers α(k) depends on the second binary number x(n) that is to be transmitted.

In the example shown, in block k=2, the second binary number x(n) for n=1 is transmitted, in block k=4, . . . , 6, the second binary number x(n) for n=2 is transmitted, in block k=9, the second binary number x(n) for n=3 is transmitted, in block k=12, 13, the second binary number x(n) for n=4 is transmitted, and in block k=15, 16, the second binary number x(n) for n=5 is transmitted. Since only the ternary numerical values "−1" and "+1" are available for the coding of a second binary number x(n), the binary numerical values "0" and "1" of the second binary numbers x(n) are mapped onto the ternary numerical values "−1" and "+1" with a one-to-one allocation (e.g. α=2x−1).

TABLE 1

| n | 1 | 2 | 3 | 4 | 5 | 6 |
|---|---|---|---|---|---|---|
| x(n) | 1 | 1 | 0 | 1 | 0 | 0 |
| 2x − 1 | 1 | 1 | −1 | 1 | −1 | −1 |

TABLE 2

| k | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| a(k) | 0 | 1 | 0 | 1 | 1 | 1 | 0 | 0 | 1 | 0 | 0 | 1 | 1 | 0 | 1 | 1 | 0 |
| n |  | 1 |  | 2 | 2 | 2 |  |  | 3 |  |  | 4 | 4 |  | 5 | 5 |  |
| α(k) | 0 | 1 | 0 | 1 | 1 | 1 | 0 | 0 | −1 | 0 | 0 | 1 | 1 | 0 | −1 | −1 | 0 |

In Table 3 shows a pseudocode that can be used to implement the above-mentioned functionality of the precoder 301.

TABLE 3

```
x__ = 2*x−1;
INIT n = 1;
FORALL k
    IF a(k−1)==0 && a(k)==1 // rising edge
        α(k) = x__(n);
    ELSEIF a(k−1)==1 && a(k)==1 //
        α(k) = x__(n);
    ELSEIF a(k−1)==1 && a(k)==0 // falling edge
        α(k) = 0;
        n = n + 1;
    ELSEIF a(k−1)==0 && a(k)==0 //
        α(k) = 0;
END
```

The insertion of additional second binary data 311 has been described above in connection with FIG. 3. It should be noted that alternatively or in addition, the first binary data 111 can be transmitted more quickly, i.e. in each contiguous block in which the first binary data 111 assume the second binary numerical value, it is possible to directly transmit the following number of the first binary data 111.

It is possible to demonstrate that the data rate can be increased by 25% by means of the method described in this document (with no change to the spectral efficiency and energy efficiency).

In this document, the modulation method has been described in the example of the modulator 112. It should be noted that the demodulator 132 of a receiver 130 can be adapted in a corresponding way and has features that correspond to the features of the modulator 112.

FIG. 4 shows a flow chart of an exemplary method 400 for the modulation of a signal with first binary data 111. As demonstrated in this document, the first binary data 111 include a sequence of first binary numbers a(k) in which each first binary number a(k) can assume either a first binary numerical value (e.g. "0") or a second binary numerical value (e.g. "1").

The method 400 includes the generation 401 of ternary data 312 in which the ternary data 312 include a sequence of ternary numbers α(k) and each ternary number α(k) can assume a first, second, or third ternary numerical value (e.g. "0," "−1," and "+1," respectively).

In addition, the method 400 includes the modulation 402 of a phase of the signal with the ternary data 312. In this case, the phase of the signal M can assume different phase states 230, where M>2 (e.g. M=4). The first, second, and third ternary numerical values can (respectively) correspond to first, second, and third state transitions 220 between the M phase states 230. In this case, a phase state 230 is maintained in the first state transition 222. On the other hand, the second state transition 221 and third state transition 223 produce a change in the phase state 230.

The ternary data 312 are generated in such a way that all first binary numbers a(k) with the first binary numerical value are allocated to ternary numbers α(k) with the first ternary numerical value. This allocation rule makes it possible to produce free spaces for the transmission of additional data (e.g. second binary data 311).

In addition, the ternary data 312 are generated in such a way that all first binary numbers a(k) with the second binary numerical value are allocated to ternary numbers α(k) with the second or third ternary numerical value so that in the sequence of ternary numbers α(k), the second ternary numerical value does not directly follow the third ternary numerical value and vice versa. This allocation rule achieves the fact that the modulated signal has a high spectral efficiency and energy efficiency.

The above-described method thus enables the transmission of additional information in order to increase the data rate and/or to increase the error robustness with the same spectral bandwidth and energy efficiency. All of this can be implemented with smaller, more advantageous, more energy efficient, and lighter-weight hardware, thus offering optimum conditions, e.g. for use on flying platforms. Another advantage lies in the possibility of implementing flexible transmissions that adapt their data rate and error-correction properties in real time (e.g. to the channel properties of the transmission channel 120).

The present invention is not limited to the exemplary embodiments shown. In particular, it should be noted that the description and figures are only intended to illustrate the principle of the proposed methods, devices, and systems.

What is claimed is:

1. A method for modulation of a signal with first binary data, wherein the first binary data include a sequence of first binary numbers, wherein each first binary number comprises either a first binary numerical value or a second binary numerical value, and wherein the method comprises:
  generating ternary data that includes a sequence of ternary numbers, wherein each ternary number comprises a first, second, or third ternary numerical value, and
  modulating a phase of the signal with the ternary data, wherein the phase of the signal can assume M different phase states, where M>2, and wherein the first, second, and third ternary numerical values correspond to first, second, and third state transitions between the M phase states,
  wherein in the first state transition, a phase state is maintained, and the second state transition and third state transition produce a change in the phase state,
  wherein generating ternary data comprises generated the ternary data such that:
    all first binary numbers with the first binary numerical value are allocated to ternary numbers with the first ternary numerical value, and
    all first binary numbers with the second binary numerical value are allocated to ternary numbers with the second or third ternary numerical value so that in the sequence of ternary numbers, the second ternary numerical value does not directly follow the third numerical value and vice versa.

2. The method according to claim 1, wherein generating ternary data comprises generating ternary data such that a contiguous block of first binary numbers with the second binary numerical value is allocated to ternary numbers with the same ternary numerical value.

3. The method according to claim 1, wherein generating ternary data comprises generating ternary data such that the second or third ternary numerical value is allocated as a function of second binary data.

4. The method according to claim 3, wherein
  the second binary data include a second binary number; and
  depending on the second binary number, a ternary number assumes the second ternary numerical value or the third ternary numerical value.

5. The method according to claim 3, further comprising:
  providing a one-to-one allocation between the first and second binary numerical values and the second and third ternary numerical values,
  wherein the ternary data are generated such that the second or third ternary numerical value is allocated as a function of the one-to-one allocation.

6. The method according to claim 5, wherein
  the one-to-one allocation is α=2x−1;
  x is the numerical value of a second binary number from the second binary data; and
  α is the numerical value of a corresponding ternary number from the ternary data.

7. The method according to claim 3, wherein the second binary data include at least one of:
  second binary numbers for error correction of at least some of the first binary numbers of the first binary data, and
  information that goes beyond the first binary data.

8. The method according to claim 3, wherein the second binary data and the first binary data are part of an overall sequence of binary numbers, and wherein the method further includes:
  allocating a binary number from the overall sequence, which directly follows a binary number with the second binary numerical value, to the second binary data.

9. The method according to claim 1, wherein
  the binary numerical values are "0" and "1;" and
  the ternary numerical values are "−1," "0," and "+1".

10. The method according to claim 1, wherein modulating the phase of the signal comprises modulating the phase of the signal in accordance with at least one of:
  between two successive ternary numbers, the phase is continuously converted from a current phase state into a new phase state in accordance with the first, second, or third state transition, and
  the ternary data using a continuous phase modulation method.

11. The method according to claim 1, wherein at least one of:
  the phase of the signal can assume M=4 different phase states,
  the different phase states can have a phase distance of $$\frac{\pi}{2}$$

from one another, and
  the M different phase states include a first phase state with a phase (0+φ), a second phase state with a phase $$\left(\frac{\pi}{2}+\varphi\right),$$

a third phase state with a phase (π+φ), and a fourth phase state with a phase $$\left(-\frac{\pi}{2}+\varphi\right),$$

where $$\varphi \in [0, \frac{\pi}{2}).$$

12. The method according to claim 1, wherein
the sequence of ternary numbers has a number of ternary numbers that corresponds to a number of first binary numbers of the sequence of first binary numbers; and/or
each first binary number is allocated to exactly one ternary number.

13. A modulator for a transmitter of a transmission system, wherein the modulator comprises:
a precoder configured to generate ternary data from first binary data, wherein the first binary data include a sequence of first binary numbers, wherein each first binary number comprises either a first binary numerical value or a second binary numerical value, and wherein the ternary data include a sequence of ternary numbers that each comprises a first, second, or third ternary numerical value; and
a modulation unit configured to modulate a phase of a signal with the ternary data, wherein the phase of the signal can assume M different phase states, where M>2, and wherein the first, second, and third ternary numerical values correspond to first, second, and third state transitions between the M phase states, wherein in the first state transition, a phase state is maintained, and the second state transition and third state transition produce a change in the phase state,
wherein the precoder is configured to generate the ternary data by:
allocating all first binary numbers with the first binary numerical value to ternary numbers with the first ternary numerical value, and
allocating all first binary numbers with the second binary numerical value to ternary numbers with the second or third ternary numerical value so that in the sequence of ternary numbers, the second ternary numerical value does not directly follow the third ternary numerical value and vice versa.

14. A method for demodulation of a signal, which has been modulated with ternary data, wherein the ternary data include a sequence of ternary numbers and each ternary number comprises a first, second, or third ternary numerical value, the method comprising:
determining ternary data from a phase of the signal, wherein the phase of the signal can assume M different phase states, where M>2, wherein the first, second, and third ternary numerical values correspond to first, second, and third state transitions between the M phase states, and wherein in the first state transition, a phase state is maintained, and the second state transition and third state transition produce a change in the phase state; and
determining first binary data from the ternary data, wherein the first binary data include a sequence of first binary numbers, where each first binary number comprises either a first binary numerical value or a second binary numerical value, and wherein the binary data are determined by:
allocating all ternary numbers with the first ternary numerical value to a first binary number with the first binary numerical value, and
allocating all ternary numbers with the second or third ternary numerical value to a first binary number with the second binary numerical value.

15. A demodulator for a receiver of a transmission system, wherein the demodulator comprises:
a demodulation unit configured to determine ternary data from a phase of a received signal, wherein the ternary data include a sequence of ternary numbers that each comprises a first, second, or third ternary numerical value, wherein the phase of the signal can assume M different phase states, where M>2, and wherein the first, second, and third ternary numerical values correspond to first, second, and third state transitions between the M phase states and, in the first state transition, a phase state is maintained, and further where the second state transition and third state transition produce a change of the phase state; and
a decoder unit configured to determine first binary data from the ternary data, wherein the first binary data include a sequence of first binary numbers, where each first binary number comprises either a first binary numerical value or a second binary numerical value, and wherein the binary data are determined by:
allocating all ternary numbers with the first ternary numerical value to a first binary number with the first binary numerical value, and
allocating all ternary numbers with the second or third ternary numerical value to a first binary number with the second binary numerical value.

* * * * *